United States Patent
Garlapati et al.

(10) Patent No.: US 11,164,300 B2
(45) Date of Patent: Nov. 2, 2021

(54) SYSTEM AND METHOD FOR AUTOMATED ELECTRONIC CATALOGUE MANAGEMENT AND ELECTRONIC IMAGE QUALITY ASSESSMENT

(71) Applicant: Walmart Apollo, LLC, Bentonville, AR (US)

(72) Inventors: Mani Kanteswara Garlapati, Bangalore (IN); Souradip Chakraborty, Bengaluru (IN); Rajesh Shreedhar Bhat, Kumta (IN)

(73) Assignee: Walmart Apollo, LLC, Bentonville, AR (US)

(*) Notice: Subject to any disclaimer, the term of this patent is extended or adjusted under 35 U.S.C. 154(b) by 102 days.

(21) Appl. No.: 16/548,162

(22) Filed: Aug. 22, 2019

(65) Prior Publication Data
US 2020/0065955 A1    Feb. 27, 2020

Related U.S. Application Data

(60) Provisional application No. 62/778,962, filed on Dec. 13, 2018.

(30) Foreign Application Priority Data

Aug. 23, 2018  (IN) .............................. 201811031632

(51) Int. Cl.
*G06K 9/62*  (2006.01)
*G06T 7/00*  (2017.01)
(Continued)

(52) U.S. Cl.
CPC .......... *G06T 7/0002* (2013.01); *G06K 9/6215* (2013.01); *G06K 9/6255* (2013.01);
(Continued)

(58) Field of Classification Search
CPC ..................... G06T 7/0002; G06T 7/70; G06T 2207/20084; G06T 2207/30168;
(Continued)

(56) References Cited

U.S. PATENT DOCUMENTS 7,702,545 B1   4/2010  Compton et al.
7,979,340 B2   7/2011  MacDonald Korth et al.
(Continued)

OTHER PUBLICATIONS

Yuan Yuan, Qun Guo, Xiaoqiang Lu, Image quality assessment: A sparse learning way, Neurocomputing, vol. 159, 2015, pp. 227-241, ISSN 0925-2312 (Year: 2015).*
(Continued)

*Primary Examiner* — Siamak Harandi
(74) *Attorney, Agent, or Firm* — Duane Morris LLP; Manita Rawat

(57) ABSTRACT

Systems, methods, and computer-readable storage media for cataloguing and assessing images. This is performed by a system which receives images of an item, and identifying, within each image, the item. The system performs a structural similarity analysis of the item and for each image applies a plurality of distortions, such that for each image in the images multiple distorted images are generated. The system identifies within the distorted images at least one feature and applies a regression model to the images using the at least one feature and the structural similarity score.

20 Claims, 5 Drawing Sheets

(51) Int. Cl.
  *G06T 5/00* (2006.01)
  *G06Q 30/06* (2012.01)
  *G06T 7/70* (2017.01)

(52) U.S. Cl.
  CPC ......... *G06Q 30/0603* (2013.01); *G06T 5/002* (2013.01); *G06T 7/70* (2017.01); *G06T 2207/20081* (2013.01); *G06T 2207/20084* (2013.01); *G06T 2207/30168* (2013.01)

(58) Field of Classification Search
  CPC .......... G06T 2207/20081; G06T 5/002; G06K 9/6215; G06K 9/6255; G06Q 30/0603
  See application file for complete search history.

(56) References Cited

U.S. PATENT DOCUMENTS

| | | | |
|---|---|---|---|
| 8,582,802 | B2 | 11/2013 | Clippard et al. |
| 8,639,036 | B1 | 1/2014 | Singer et al. |
| 8,798,363 | B2 | 8/2014 | Bhardwaj et al. |
| 9,558,510 | B2 | 1/2017 | Melcher et al. |
| 9,892,133 | B1 | 2/2018 | Biessmann et al. |
| 2012/0307116 | A1 | 12/2012 | Lansel et al. |
| 2016/0321523 | A1 | 11/2016 | Sen et al. |
| 2016/0379352 | A1* | 12/2016 | Zhang et al. ......... G06T 7/0002 382/157 |
| 2017/0032222 | A1 | 2/2017 | Sharma et al. |
| 2017/0186032 | A1 | 6/2017 | Rangasamy Kannadasan et al. |
| 2020/0320769 | A1* | 10/2020 | Chen .................... G06K 9/6256 |

OTHER PUBLICATIONS

P. E. Rybski, D. Huber, D. D. Morris and R. Hoffman, "Visual classification of coarse vehicle orientation using Histogram of Oriented Gradients features," 2010 IEEE Intelligent Vehicles Symposium, San Diego, CA, 2010, pp. 921-928, doi: 10.1109/IVS.2010.5547996. (Year: 2010).*

X. Liu, J. Van De Weijerand A. D. Bagdanov, "RankIQA: Learning from Rankings for No-Reference Image Quality Assessment," 2017 IEEE International Conference on Computer Vision (ICCV), Venice, 2017, pp. 1040-1049, doi: 10.1109/ICCV.2017.118. (Year: 2017).*

J. D. Ruikar, A. K. Sinha and S. Chaudhury, "Structural SIMilarity and correlation based filtering for Image Quality Assessment," 2014 International Conference on Communication and Signal Processing, Melmaruvathur, 2014, pp. 476-479, doi: 10.1109/ICCSP.2014.6949887. (Year: 2014).*

International Search Report and Written Opinion dated Nov. 8, 2019 in corresponding International Application No. PCT/US2019/047737.

* cited by examiner

SYSTEM AND METHOD FOR AUTOMATED ELECTRONIC CATALOGUE MANAGEMENT AND ELECTRONIC IMAGE QUALITY ASSESSMENT

CROSS-REFERENCE TO RELATED APPLICATIONS

This patent application claims priority to Indian Provisional Application No. 201811031632, filed Aug. 23, 2018, and U.S. Provisional Application No. 62/778,962, filed Dec. 13, 2018, contents of which are incorporated by reference herein.

BACKGROUND

1. Technical Field

The present disclosure relates to automated electronic catalogue management and electronic image quality assessment, and more specifically to using automated electronic image quality assessment to catalogue and re-order images.

2. Introduction

Catalogue management is a very important aspect in e-commerce as it helps the visitors to websites efficiently select respective items. In every retail website, the items displayed are in a particular order based on their respective categories. For items which have more than one view, the order of the views is predetermined based on the item classification. However, when receiving images/photographs of the item, there are often several problems with the received information. First, there is a question of identifying the item: do the images (or associated metadata) predefine the object in question? If not, how is the object identified? Second, there is a question of quality: do the images meet the required quality for display on an official website? If being performed by a human being, such determinations may lack accuracy due to the subjective ability of human visual analysis. Third, using current technology, the images must be manually ordered according to the object's classification, which again relies on the inaccuracy of human in completing the task.

Technical Problem

How to train a computer to correctly identify and classify an object when electronic images of the object have distinct orientations and quality.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

An exemplary method performed according to the concepts disclosed herein can include: receiving a plurality of images of an item; identifying, via a processor configured to perform image analysis, and within each image in the plurality of images, the item; performing, via the processor, a structural similarity analysis of the item, to yield a structural similarity score; for each image in the plurality of images applying, via the processor, a plurality of distortions, such that for each image in the plurality of images a plurality of distorted images are generated; identifying, via the processor, within the plurality of distorted images associated with each image in the plurality of images, at least one feature; and applying, via the processor, a regression model to the plurality of images using the at least one feature and the structural similarity score.

An exemplary system configured according to the concepts disclosed herein can include: a processor configured to perform image analysis; and a computer-readable storage medium having instructions stored which, when executed by the processor, cause the processor to perform operations including: receiving a plurality of images of an item; identifying, within each image in the plurality of images, the item; performing a structural similarity analysis of the item, to yield a structural similarity score; for each image in the plurality of images applying a plurality of distortions, such that for each image in the plurality of images a plurality of distorted images are generated; identifying within the plurality of distorted images associated with each image in the plurality of images, at least one feature; and applying a regression model to the plurality of images using the at least one feature and the structural similarity score.

An exemplary non-transitory computer-readable storage medium configured according to this disclosure can have instructions stored which, when executed by a computing device configured to perform image processing, cause the computing device to perform operations including: receiving a plurality of images of an item; identifying, within each image in the plurality of images, the item; performing a structural similarity analysis of the item, to yield a structural similarity score; for each image in the plurality of images applying a plurality of distortions, such that for each image in the plurality of images a plurality of distorted images are generated; identifying within the plurality of distorted images associated with each image in the plurality of images, at least one feature; and applying a regression model to the plurality of images using the at least one feature and the structural similarity score.

DETAILED DESCRIPTION

Figure 1:
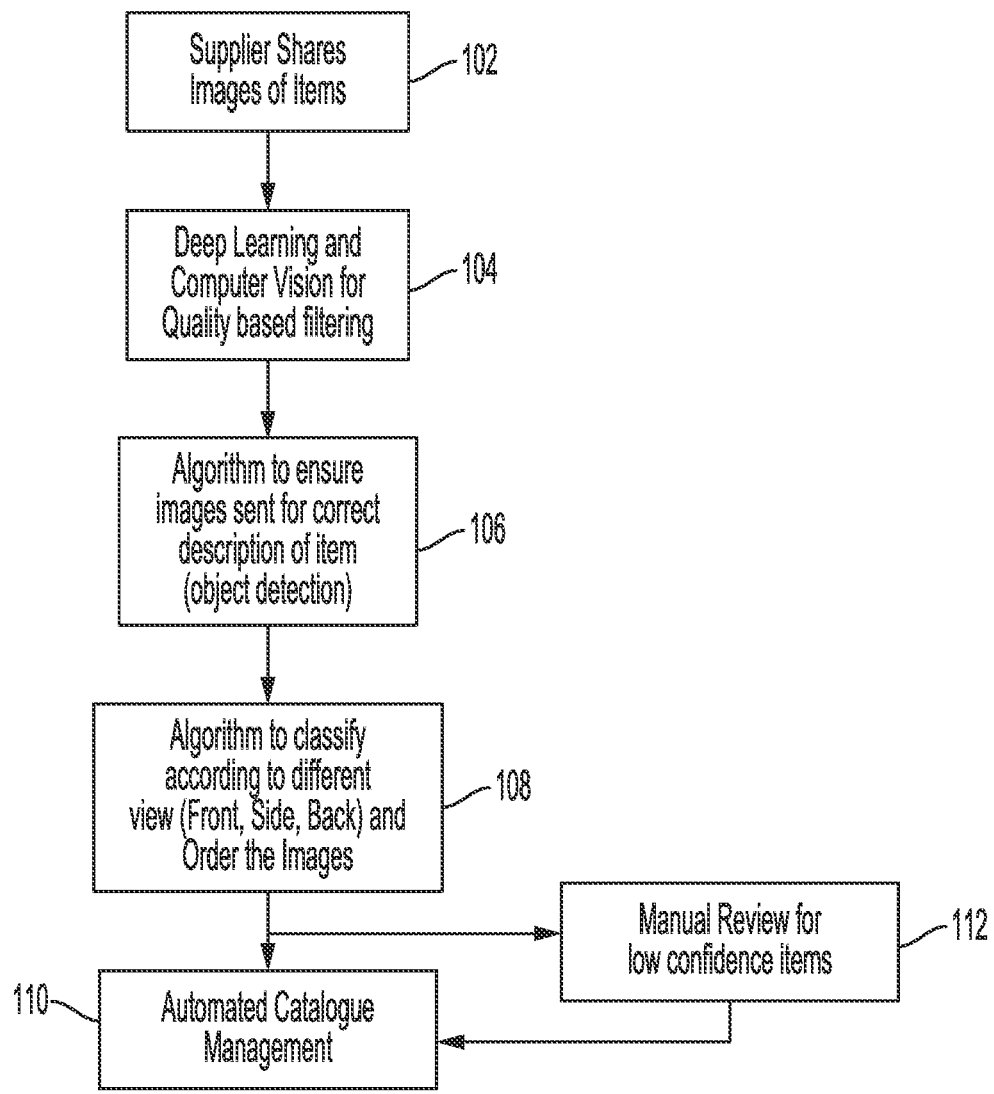
FIG. 1 illustrates a first example method embodiment.

Various embodiments of the disclosure are described in detail below. While specific implementations are described, it should be understood that this is done for illustration purposes only. Other components and configurations may be used without parting from the spirit and scope of the disclosure. This disclosure is directed to automated electronic catalogue management, electronic image quality assessment, and selecting/ordering electronic images for use in an electronic catalogue based upon the assessments made. More specifically, the solutions disclosed provide for an algorithm (using applications of computer vision and deep learning) which can automatically identify the various complex orientations of the catalogue image and sort it accordingly. Next step an algorithm which can detect the quality of the catalogue images (using a structural similarity metric and/or deep learning), such that quality can be predicted for images without a reference image or subject.

Current electronic image classification practices often rely on rule-based methods to classify image orientations, which is prone to errors and not robust. Likewise, when a histogram of gradients is currently used in image classification, the accuracy achieved is insufficient for quality classification. In addition, with regards to the image quality assessment, metrics such as Signal to Noise Ratio (SNR), mean squared error, etc. are often used. Again, such metrics fail to provide adequate results and human perceived quality.

Tasks associated with four phases of the operations are disclosed and described. These tasks/phases can be combined, excluded, or otherwise used as required for any specific embodiment.

Phase 1—Image Orientation Classification

To classify an image into one of a predetermined set of classifications (such as Front, Side, and Back views), the image can be compared to statistical markers of previously categorized images. That is, multiple images can be analyzed, their features extracted, and a histogram of gradient features used in those images can be generated showing predictions of features for objects in a known orientation. For example, multiple shirts having a front view can be analyzed, and the system can identify left and right sleeves within the images, as well as a "V" or "swoop" where a shirt neckline appears. By contrast, the angle of an image a side view may result in a significantly smaller proportion of an image being associated with the neckline. By comparing the features of a new image to features of known images, a histogram of gradient features of the new image can be identified as predictors. A histogram of gradient based features are robust features which, for example, give direction of the color gradient within an image, such that the histogram of gradient based features differ between different images. These predictors can provide statistical estimates of how similar the new image, or portions of the image, are to known images (or portions of the known images).

The predictors can also be used as inputs into a Convolution Neural Network (CNN) model trained to identify the distinct classifications of images. In one configuration, pre-trained embeddings from a predefined model are extracted, and using the extracted features a machine learning model is formed which in turn generates the CNN model. The CNN model uses a cross-correlation of the predictors with known features from previous images to identify common aspects between the known features and the current image being analyzed. In one example, the CNN model (or portions of the model extracted) can be split into a 3×3 depth-wise convolution and a 1×1 point-wise convolution, which increases accuracy and speed. In some cases, a logistic regression model (trained on similar data as the CNN model) can be combined with the CNN model (and/or other models) as part of the image orientation classification, which can further increase the overall object (and its orientation) recognition.

Phase 2—Image Quality Assessment

To assess the quality of an image, traditional (subjective) assessments by human beings does not result in a repeatable accuracy. To counter this, systems configured according to this disclosure can use structural similarity to identify the object, then determine the quality of the object identified. Metrics to determine the similarity can include peak signal-to-noise ratio (PSNR) and the mean squared error (MSE), which can operate directly from the intensity of the image. However, such metrics fail to account for how a human being would perceive the image. To account for human perception, the system utilizes a structural similarity index to which the object is compared, where the structural similar index can take into account the impact of changes in luminescence, contrast, and structure within the image being considered. The structural similarity index can be a single score which takes into account all of the individual factors (such as luminescence, contrast, etc.).

To further assess the image, a methodology is needed which can operate without reference images, or alternatively with a very small data set. Instead, the architecture and data pipeline described makes the model independent of a reference image, such that when an image is received, the system extracts the quality embeddings from the architecture, which serves as an input to the ridge regression model to predict the structural similarity score (which in turn indicates the quality of the image). To accomplish this, distortion is added to the one or more images, resulting in the original (non-distorted) images and distorted images of the object. If a particular configuration is using reference images, the reference images can be distorted using the same distortion/noise algorithms (such as mean blur, Gaussian blur, bilateral blur, median blur, etc.). Table 1 illustrates an example of how a sample image can be distorted and the resulting classes. The features, in this example, are extracted initially from pre-defined embeddings which have been trained with dense layers in classifying the quality of images, thereby forming quality embeddings.

TABLE 1

| Type of Noise added | Kernels and Parameters | No Of Classes |
|---|---|---|
| Reference Image | — | 1 |
| Mean Blur | (5, 5), (25, 25), (55, 55), (75, 75) | 4 |
| Gaussian Blur | (5, 5), (25, 25), (55, 55), (95, 95) | 4 |
| Bilateral Blur | (9, 50, 50), (9, 125, 125) | 2 |
| Median Blur | 5, 27 | 2 |

A comparison between the original images and the distorted images (as well as distorted reference images, if available) can then result in features related to quality characteristics of the images being analyzed.

Once the quality related features have been identified/extracted from the images, a structural similarity score for the distorted images is computed. This structural similarity score can, when using reference images, also be based on the reference images (including distorted reference images). The quality related features can be taken as predictor variables, and the structural similarity score for one or more of the images can be used as response variables. A ridge regression (a technique for analyzing multiple regression data that has collinearity) model can be used with the structural similarity score. Ridge regression model is regularized regression which, in this example, contains additional constraints on the model parameters which are not present in linear regression. L2 regularization is used in ridge regressions. The regularization parameter has been determined intelligently suitable for the problem.

In other words, when a new image is detected, features can be extracted from the image. These features can be used as a test data point for the ridge regression model while a structural similarity score is generated (in parallel or in series) for that image. The system can determine, based on a business unit to which the image(s) will be assigned, cutoffs for the similarity score and/or test data to determine if the image quality is at an acceptable, predetermined quality, or if the images must be revised or otherwise corrected.

These variations shall be described herein as the various embodiments are set forth. The disclosure now turns to FIG. 1. FIG. 1 illustrates a first example method embodiment. In this example, a supplier shares images of items (102) with the purpose of the receiving entity publishing the images in such a way that consumers can view the images on the Internet. For example, the supplier can supply an online marketplace with a generic, "stock" photograph of the item to be sold. The system uses deep learning and computer vision to perform quality based filtering (104) on the images received. More specifically, the system uses a processor, specifically configured to perform image processing, to assess the quality of the images received. In addition, the processor deploys an algorithm to ensure images sent/received are for the correct description of the item (106) (i.e., object detection and comparison of the detected object to any descriptions received). In addition, the system deploys an algorithm to classify the images according to the different views (such as Front, Side, and Back views), and order the images (108). The system can provide confidence of the classification of the images, confidence that the description is correct, and/or that the order of the images is correct. If one or more of these indications is low, the system can prompt manual review for the low confidence items (112). Finally, the system can provide the results of the assessments and algorithms to an automated catalogue management (110).

Figure 2:
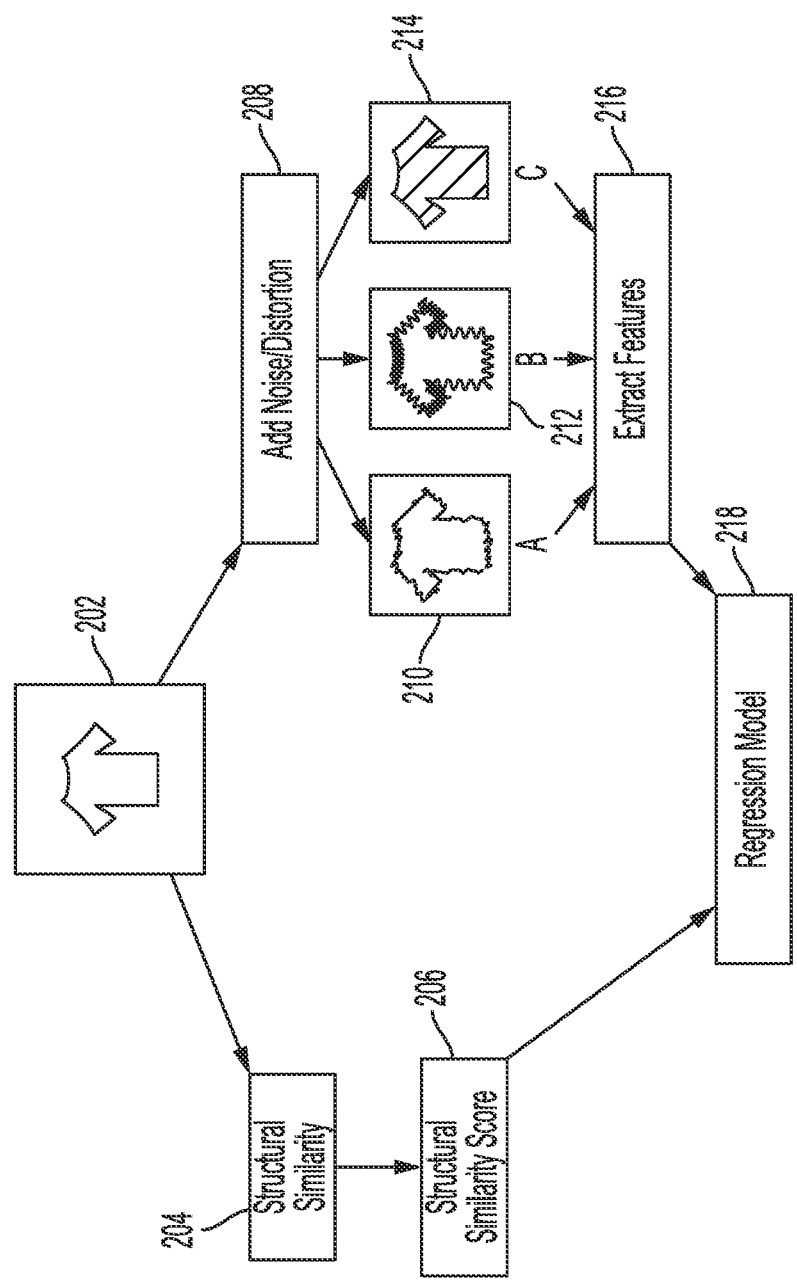
FIG. 2 illustrates an exemplary flowchart of a disclosed process.

FIG. 2 illustrates an exemplary flowchart of a disclosed process for assessing the quality of an image 202 (or images, depending on a particular configuration). As illustrated, the image 202 is received and two separate processes are performed. On the left is illustrated performing a structural similarity analysis 204, with the result being a structural similarity score 206. On the right is illustrated adding noise/distortion 208 to the received image, resulting in multiple images 210, 212, 214 which are derivatives of the original image 202. Using the original image 202 and the derivative images 210, 212, 214, features are extracted 216. In general, the features extracted 216 are features common across all the models 202, 210, 212, 214 (both distorted and original), however in some configurations the features extracted can be identified as associated with only the original 202 and not found in any of the distorted images 210, 212, 214. The resulting extracted features 216 and the structural similarity score 206 are then applied to a regression model 218, such as a ridge regression model, which can be used to assess the quality of the image 202 to a standard.

Figure 3:
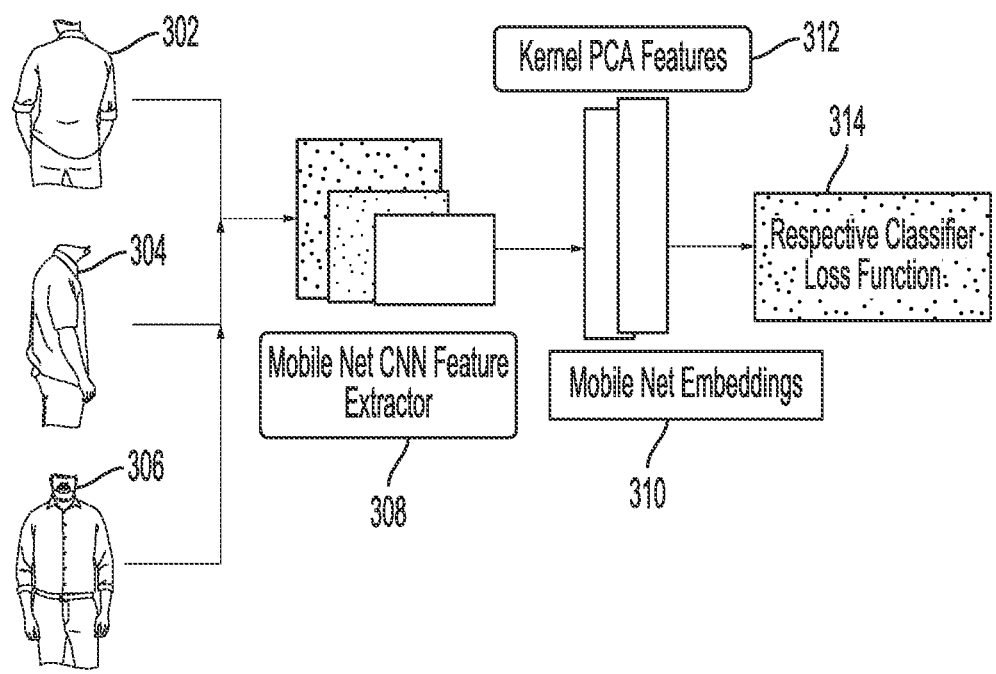
FIG. 3 illustrates an exemplary convolutional neural network architecture for image orientation classification.

FIG. 3 illustrates an exemplary convolutional neural network architecture for image orientation classification. In this example, images 302, 304, 306 of an object are received from distinct angles. As illustrated, the images are of a shirt as viewed from the back 302, side 304, and front 306. These images are sent to a CNN feature extractor 308, such as a CNN feature extractor (e.g., a MobileNet or other streamlined architecture which uses depth-wise separable convolutions to build neural networks), or a custom CNN feature extractor. The kernel PCA (Principal Component Analysis) features 312 are extracted along with image embeddings 310. These outputs 312, 310 are then input to a respective classifier loss function 314, which can determine the image orientation based on the loss detected.

Figure 4:
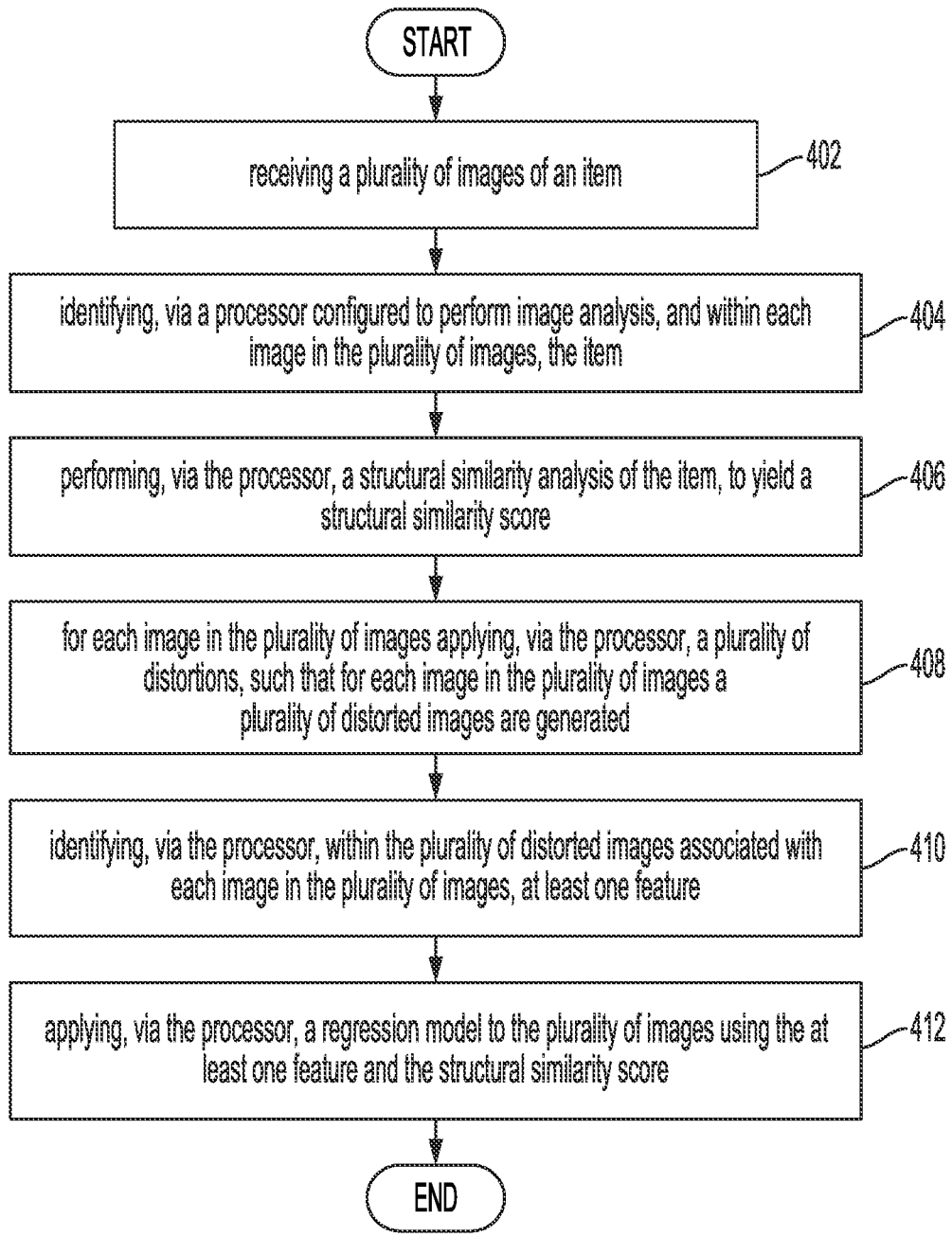
FIG. 4 illustrates a second exemplary method embodiment.

FIG. 4 illustrates a second exemplary method embodiment. In this example, the system receives a plurality of images of an item (402) and identifies, via a processor configured to perform image analysis, and within each image in the plurality of images, the item (404). In some configurations, this identification process can be further augmented using metadata and/or a database of products or items. The system performs, via the processor, a structural similarity analysis of the item, to yield a structural similarity score (406) and, for each image in the plurality of images applying, via the processor, a plurality of distortions, such that for each image in the plurality of images a plurality of distorted images are generated (408). The system identifies, via the processor, within the plurality of distorted images associated with each image in the plurality of images, at least one feature (410), and applies, via the processor, a regression model to the plurality of images using the at least one feature and the structural similarity score (412).

In some configurations, the method can further include ordering, via the processor, the plurality of images based on applying the regression model to the plurality of images. Likewise, the method can further include training a convolution neural network using the at least one feature, to yield a trained convolution neural network and using the trained convolution neural network during the applying of the regression model to the plurality of images.

In some configurations, the plurality of distortions can include a mean blur, a Gaussian blur, and a bilateral blur. In some configurations, the regression model is a ridge regression.

In some configurations, the structural similarity identifies at least luminance, contrast, and structure of the item.

In some configurations, the plurality of images include a front image, a side image, and a back view of the item.

Figure 5:
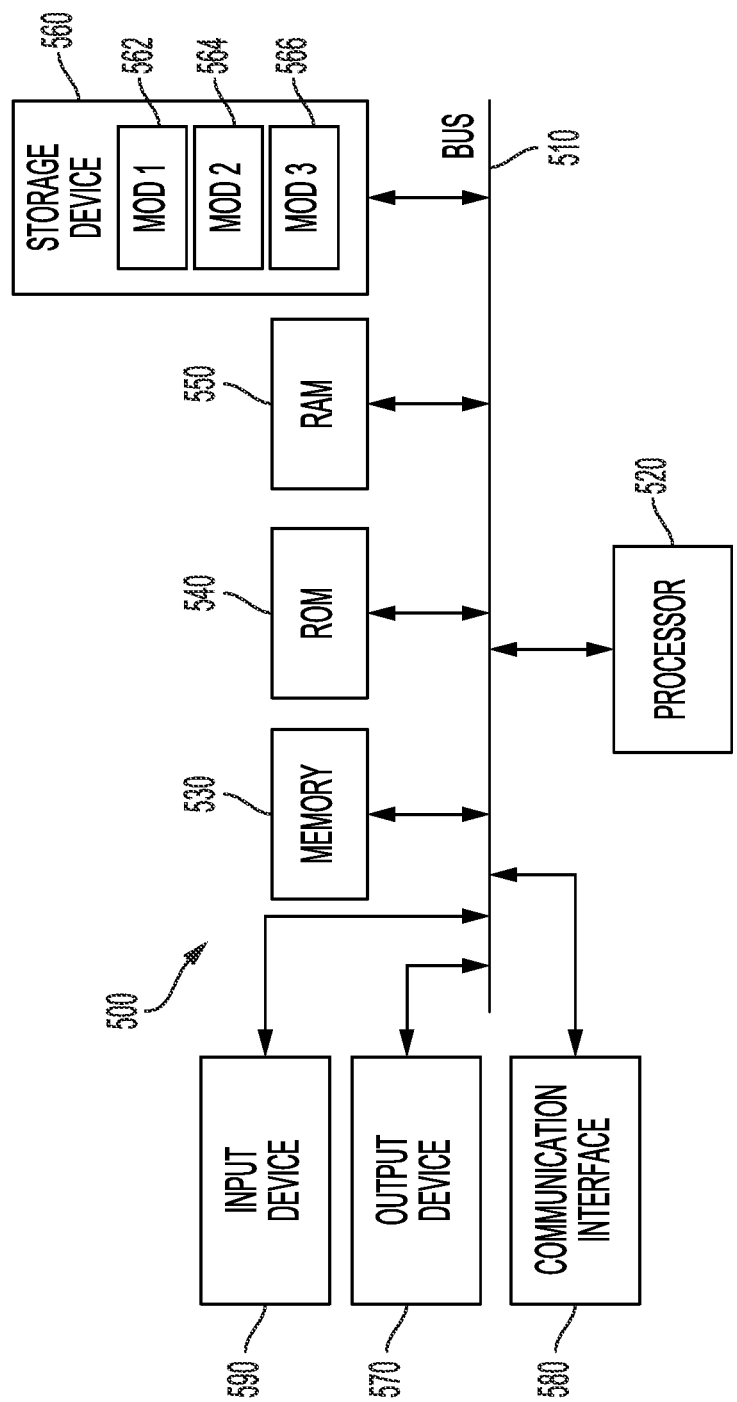
FIG. 5 illustrates an example method embodiment.

With reference to FIG. 5, an exemplary system includes a general-purpose computing device 500, including a processing unit (CPU or processor) 520 and a system bus 510 that couples various system components including the system memory 530 such as read-only memory (ROM) 540 and random access memory (RAM) 550 to the processor 520. The system 500 can include a cache of high-speed memory connected directly with, in close proximity to, or integrated as part of the processor 520. The system 500 copies data from the memory 530 and/or the storage device 560 to the cache for quick access by the processor 520. In this way, the cache provides a performance boost that avoids processor 520 delays while waiting for data. These and other modules can control or be configured to control the processor 520 to perform various actions. Other system memory 530 may be available for use as well. The memory 530 can include multiple different types of memory with different performance characteristics. It can be appreciated that the disclosure may operate on a computing device 500 with more than one processor 520 or on a group or cluster of computing devices networked together to provide greater processing capability. The processor 520 can include any general purpose processor and a hardware module or software module, such as module 1 562, module 2 564, and module 3 566 stored in storage device 560, configured to control the processor 520 as well as a special-purpose processor where software instructions are incorporated into the actual processor design. The processor 520 may essentially be a completely self-contained computing system, containing multiple cores or processors, a bus, memory controller, cache, etc. A multi-core processor may be symmetric or asymmetric.

The system bus 510 may be any of several types of bus structures including a memory bus or memory controller, a peripheral bus, and a local bus using any of a variety of bus architectures. A basic input/output (BIOS) stored in ROM 540 or the like, may provide the basic routine that helps to transfer information between elements within the computing device 500, such as during start-up. The computing device 500 further includes storage devices 560 such as a hard disk drive, a magnetic disk drive, an optical disk drive, tape drive or the like. The storage device 560 can include software modules 562, 564, 566 for controlling the processor 520. Other hardware or software modules are contemplated. The storage device 560 is connected to the system bus 510 by a drive interface. The drives and the associated computer-readable storage media provide nonvolatile storage of computer-readable instructions, data structures, program modules and other data for the computing device 500. In one aspect, a hardware module that performs a particular function includes the software component stored in a tangible computer-readable storage medium in connection with the necessary hardware components, such as the processor 520, bus 510, display 570, and so forth, to carry out the function. In another aspect, the system can use a processor and computer-readable storage medium to store instructions which, when executed by the processor, cause the processor to perform a method or other specific actions. The basic components and appropriate variations are contemplated depending on the type of device, such as whether the device 500 is a small, handheld computing device, a desktop computer, or a computer server.

Although the exemplary embodiment described herein employs the hard disk 560, other types of computer-readable media which can store data that are accessible by a computer, such as magnetic cassettes, flash memory cards, digital versatile disks, cartridges, random access memories (RAMs) 550, and read-only memory (ROM) 540, may also be used in the exemplary operating environment. Tangible computer-readable storage media, computer-readable storage devices, or computer-readable memory devices, expressly exclude media such as transitory waves, energy, carrier signals, electromagnetic waves, and signals per se.

To enable user interaction with the computing device 500, an input device 590 represents any number of input mechanisms, such as a microphone for speech, a touch-sensitive screen for gesture or graphical input, keyboard, mouse, motion input, speech and so forth. An output device 570 can also be one or more of a number of output mechanisms known to those of skill in the art. In some instances, multimodal systems enable a user to provide multiple types of input to communicate with the computing device 500. The communications interface 580 generally governs and manages the user input and system output. There is no restriction on operating on any particular hardware arrangement and therefore the basic features here may easily be substituted for improved hardware or firmware arrangements as they are developed.

The steps outlined herein are exemplary and can be implemented in any combination thereof, including combinations that exclude, add, or modify certain steps.

Use of language such as "at least one of X, Y, and Z" or "at least one or more of X, Y, or Z" are intended to convey a single item (just X, or just Y, or just Z) or multiple items (i.e., {X and Y}, {Y and Z}, or {X, Y, and Z}). "At least one of" is not intended to convey a requirement that each possible item must be present.

The various embodiments described above are provided by way of illustration only and should not be construed to limit the scope of the disclosure. Various modifications and changes may be made to the principles described herein without following the example embodiments and applications illustrated and described herein, and without departing from the spirit and scope of the disclosure.

We claim:

1. A method comprising:
receiving a plurality of electronic images of an item;
identifying, via a processor configured to perform image analysis, and within each image in the plurality of images, the item;
performing, via the processor, a structural similarity analysis of the item, to yield a structural similarity score;
for each image in the plurality of images applying, via the processor, a plurality of distortions, such that for each image in the plurality of images a plurality of distorted images are generated;
identifying, via the processor, within the plurality of distorted images associated with each image in the plurality of images, at least one feature; and
applying, via the processor, a regression model to the plurality of images using the at least one feature and the structural similarity score.

2. The method of claim 1, further comprising:
ordering, via the processor, the plurality of images based on applying the regression model to the plurality of images.

3. The method of claim 1, wherein the plurality of distortions comprises a mean blur, a Gaussian blur, and a bilateral blur.

4. The method of claim 1, wherein the regression model is a ridge regression.

5. The method of claim 1, wherein the structural similarity identifies at least luminance, contrast, and structure of the item.

6. The method of claim 1, wherein the plurality of images comprises a front image, a side image, and a back view of the item.

7. The method of claim 1, further comprising: training a convolution neural network using the at least one feature, to yield a trained convolution neural network; and using the trained convolution neural network during the applying of the regression model to the plurality of images.

8. A system, comprising:
a processor configured to perform image analysis; and
a computer-readable storage medium having instructions stored which, when executed by the processor, cause the processor to perform operations comprising:
receiving a plurality of electronic images of an item;
identifying, within each image in the plurality of images, the item;
performing a structural similarity analysis of the item, to yield a structural similarity score;
for each image in the plurality of images applying a plurality of distortions, such that for each image in the plurality of images a plurality of distorted images are generated;
identifying within the plurality of distorted images associated with each image in the plurality of images, at least one feature; and
applying a regression model to the plurality of images using the at least one feature and the structural similarity score.

9. The system of claim 8, the computer-readable storage medium having instructions stored which, when executed by the processor, cause the processor to perform operations comprising:
 ordering the plurality of images based on applying the regression model to the plurality of images.

10. The system of claim 8, wherein the plurality of distortions comprises a mean blur, a Gaussian blur, and a bilateral blur.

11. The system of claim 8, wherein the regression model is a ridge regression.

12. The system of claim 8, wherein the structural similarity identifies at least luminance, contrast, and structure of the item.

13. The system of claim 8, wherein the plurality of images comprises a front image, a side image, and a back view of the item.

14. The system of claim 8, the computer-readable storage medium having instructions stored which, when executed by the processor, cause the processor to perform operations comprising:
 training a convolution neural network using the at least one feature, to yield a trained convolution neural network; and
 using the trained convolution neural network during the applying of the regression model to the plurality of images.

15. A non-transitory computer-readable storage medium having instructions stored which, when executed by a computing device configured to perform image processing, cause the computing device to perform operations comprising:
 receiving a plurality of electronic images of an item;
 identifying, within each image in the plurality of images, the item;
 performing a structural similarity analysis of the item, to yield a structural similarity score;
 for each image in the plurality of images applying a plurality of distortions, such that for each image in the plurality of images a plurality of distorted images are generated;
 identifying within the plurality of distorted images associated with each image in the plurality of images, at least one feature; and
 applying a regression model to the plurality of images using the at least one feature and the structural similarity score.

16. The non-transitory computer-readable storage medium of claim 15, having instructions stored which, when executed by the computing device, cause the computing device to perform operations comprising:
 ordering the plurality of images based on applying the regression model to the plurality of images.

17. The non-transitory computer-readable storage medium of claim 15, wherein the plurality of distortions comprises a mean blur, a Gaussian blur, and a bilateral blur.

18. The non-transitory computer-readable storage medium of claim 15, wherein the regression model is a ridge regression.

19. The non-transitory computer-readable storage medium of claim 15, wherein the structural similarity identifies at least luminance, contrast, and structure of the item.

20. The non-transitory computer-readable storage medium of claim 15, wherein the plurality of images comprises a front image, a side image, and a back view of the item.

\* \* \* \* \*